May 6, 1924.
U. G. SWEENEY
LAWN RAKE
Filed Sept. 21, 1923
1,493,292
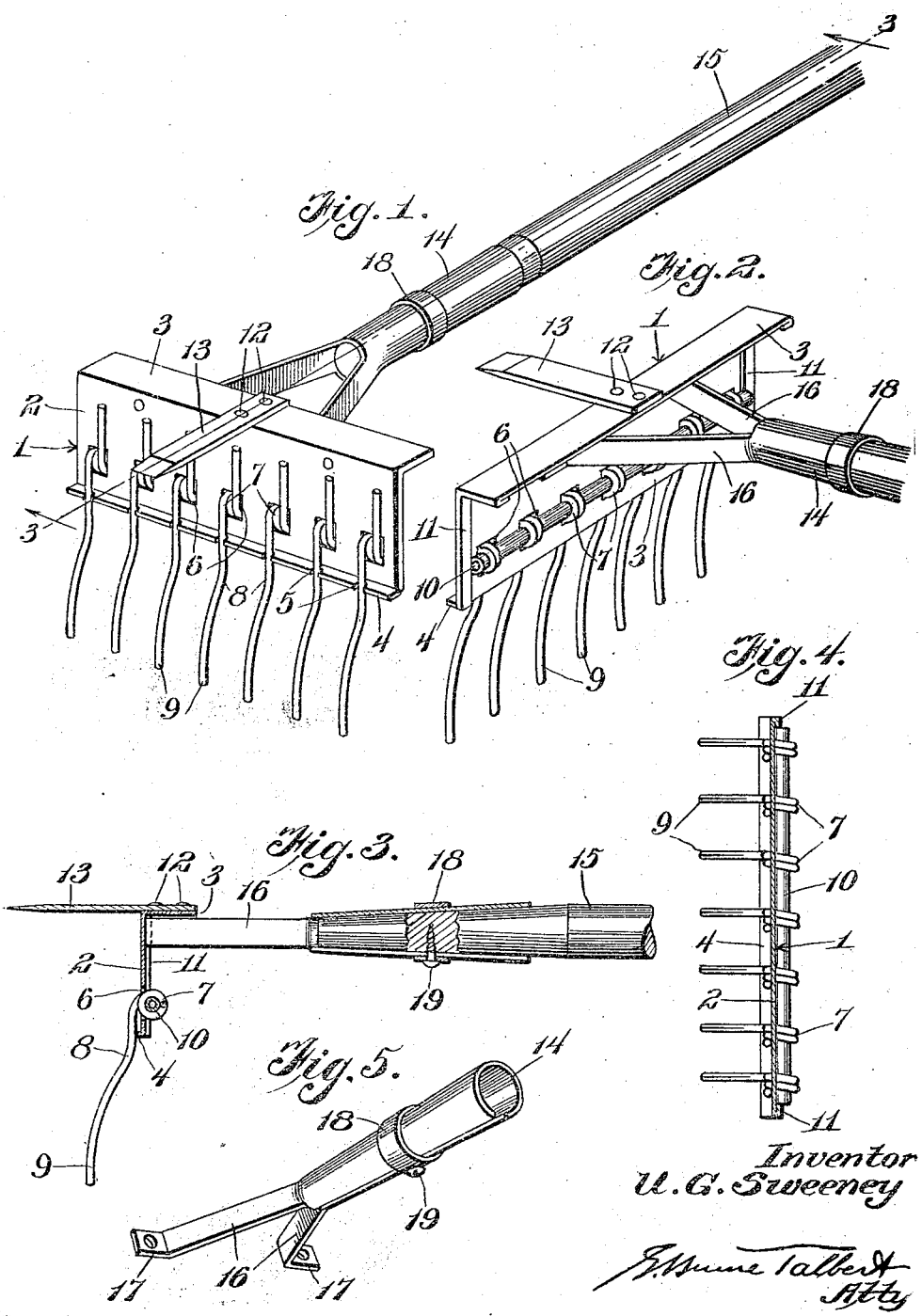
Inventor
U. G. Sweeney Patented May 6, 1924.

1,493,292

UNITED STATES PATENT OFFICE.

ULYSSES G. SWEENEY, OF FRESNO, CALIFORNIA.

LAWN RAKE.

Application filed September 21, 1923. Serial No. 664,053.

*To all whom it may concern:*

Be it known that ULYSSES G. SWEENEY, a citizen of the United States, residing at Fresno, in the county of Fresno and State of California, has invented new and useful Improvements in Lawn Rakes, of which the following is a specification.

Heretofore in lawn rakes, the teeth are rigid, hence in case the teeth entangle with weeds or other obstructions there is no give, therefore the liability of breaking the teeth. Furthermore, the grass is very apt to be torn up by the roots due to the rigidity of the teeth.

It is the purpose of the present invention to provide a lawn rake wherein the teeth are individually yieldable, allowing the teeth to give in case of contact with obstructions or in case of entanglement with heavy growths.

Another purpose is to provide, in a lawn rake, a construction including a frame with means for retaining the rake teeth in position and means for holding them equally spaced, there being seats for the teeth to hold the teeth in position when the rake is not in use.

Still another purpose is to provide a frame with a plurality of equally spaced openings for the reception of resilient coils formed in the teeth, there being means passing through the aligned coils to retain the teeth on the frame and allow the teeth to enter their seats.

A further purpose is the provision of a lawn rake including means carried thereby for cutting the weeds and wild growth out of a lawn.

A still further purpose is the provision of improved handle attaching means for connecting the handle to the body of the rake.

It is to be understood that the particulars herein given are in no way limitative and that, while still keeping within the scope of the invention, any desired modifications of detail and desired proportions may be made in the apparatus according to the circumstances.

The invention comprises further features and combinations of parts to be hereinafter set forth, shown in the drawings and claimed.

In the drawings:

Figure 1 is a view in perspective of the improved rake constructed in accordance with the invention.

Figure 2 is a similar view, viewing the rake from another angle.

Figure 3 is a sectional view on line 3—3 of Figure 1.

Figure 4 is a view transversely of the frame of the rake, showing how the coils of the teeth are mounted.

Figure 5 is a detail view of the handle attaching means.

Referring to the drawings, 1 designates a frame which may be of any suitable proportions and constructed of any suitable material, preferably sheet metal. This frame is angular in cross section and comprises the portion 2, the flange 3 at the top of the frame and the smaller flange 4 at the lower edge of the frame. The latter flange is provided with a plurality of spaced notches 5.

The body portion 2 of the frame is provided with a plurality of openings 6 for the reception of the spring coils 7 formed in the body of the teeth 8. The teeth are constructed of spring wire or rod material of proper diameter in cross section, so that the coils 7 may be formed. The raking portions 9 of the teeth which project below the frame are of compound curved formation, allowing the teeth to more readily give or yield in the act of passing over the lawn.

The openings 6 are disposed coincident to the notches in order that the body of the teeth may seat in the notches to hold the teeth equally spaced. The coils act to restore the teeth to their initial positions in engagement with the notches. The coils 7 are more or less separated or spaced, necessitating their being pressed together, whereby the coils may enter the openings 6.

A hollow rod 10 is passed through the aligned coils of the rake teeth to retain the coils in the openings. It is to be understood that the coils are smaller in diameter than the diameter of the tubular rod, so that when the rod is inserted through the coils, the coils will expand slightly. In this way, the coils firmly grip on the tubular rod so that there can be no play of the teeth. The notches in the flange at the bottom of the frame prevent the teeth from springing sidewise. Furthermore, owing to the teeth being constructed of resilient material, they are not likely to break. However, if one of the teeth should break, it can be easily replaced with a new one.

The end edges of the frame or head of the rake are overbent, as shown at 11. The overbent portions 11 at points adjacent the ends of the tubular rod act as abutments for the end of the rod to prevent axial movement. A tubular rod is used in lieu of a solid rod for the purpose of reducing the weight of the rake.

Secured at 12 to the flange 3 at the top of the frame of the rake is a blade 13, the end edge of which is sharpened and is designed for cutting weeds and wild growth out of a lawn. In using the blade, the rake is inverted so that the blade can be inserted in the ground at an angle for the purpose of cutting the weeds below the bud with no injury to the lawn grass.

A split sleeve 14 of tapering formation is provided constituting a socket for the handle 15. The sleeve is provided at its forward end with diverging arms 16 which terminate in ears 17 which are secured to the frame or head of the rake beneath the flange 3. The end of the handle which engages the socket of the sleeve is tapered. A suitable collar 18 surrounds the sleeve and engaging through its wall is a screw 19 which passes through the split of the sleeve. In other words, the collar 18 is disposed so that the screw may pass through the split.

Heretofore there has been no way of tightening the handles in the sockets of rakes when they loosen. With this particular construction, it is possible to remove the screw and then by reducing the taper of the handle and reinserting it in the sleeve, the collar may be adjusted further back on the sleeve, allowing the screw to take a new hold in the handle. In fact, the screw may be removed and the handle simply turned to permit the screw to take a new hold in the handle. When the handle is turned, it may be driven into the sleeve and the collar forced as far back as it will go on the sleeve and the screw reinserted and engaged with the handle. It is possible to use two collars, if necessary, but if a single collar is employed it should be relatively wide to insure holding the sleeve in position.

The invention having been set forth, what is claimed is:

1. A lawn rake including a head provided with a plurality of spaced openings, a plurality of rake teeth having spring coils engaged through the openings, means passing through the coils to retain the coils engaged with the openings.

2. A lawn rake including a head provided with a plurality of spaced openings, a plurality of rake teeth having spring coils engaged through the openings, means passing through the coils to retain the coils engaged with the openings, and means at the lower edge of the head for retaining the rake teeth equally spaced and preventing lateral play.

3. A lawn rake including a head provided with a plurality of spaced openings, a plurality of rake teeth having spring coils engaged through the openings, means passing through the coils to retain the coils engaged with the openings, and means at the end edges of the head to prevent longitudinal movement of the coil retaining means.

4. A lawn rake including a head provided with a plurality of spaced openings, a plurality of rake teeth having spring coils engaged through the openings, means passing through the coils to retain the coils engaged with the openings, means at the end edges of the head to prevent longitudinal movement of the coil retaining means, and means at the lower edge of the head for retaining the rake teeth equally spaced and preventing lateral play.

In testimony whereof he affixes his signature.

ULYSSES G. SWEENEY.